(12) United States Patent
Watanabe

(10) Patent No.: US 7,938,749 B2
(45) Date of Patent: May 10, 2011

(54) CONTROL SYSTEM AND VEHICLE

(75) Inventor: Hiroto Watanabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 845 days.

(21) Appl. No.: 11/940,474

(22) Filed: Nov. 15, 2007

(65) Prior Publication Data

US 2008/0119324 A1 May 22, 2008

(30) Foreign Application Priority Data

Nov. 16, 2006 (JP) ................................. 2006-310069

(51) Int. Cl.
*B60W 10/06* (2006.01)
*B60W 10/10* (2006.01)

(52) U.S. Cl. ...................................................... 477/109

(58) Field of Classification Search .................. 477/106, 477/109
See application file for complete search history.

(56) References Cited

U.S. PATENT DOCUMENTS

| | | | | |
|---|---|---|---|---|
| 1,149,419 | A * | 8/1915 | Stratton | 477/109 |
| 1,996,915 | A * | 4/1935 | Fleischel | 477/109 |
| 4,677,880 | A * | 7/1987 | Hattori et al. | 477/77 |
| 4,889,014 | A * | 12/1989 | Iwata | 477/101 |
| 5,079,969 | A | 1/1992 | Kato et al. | |
| 5,580,331 | A | 12/1996 | Shiraishi et al. | |
| 5,595,551 | A | 1/1997 | Hedstrom et al. | |
| 5,669,849 | A * | 9/1997 | Tabata et al. | 477/102 |
| 5,738,607 | A | 4/1998 | Kondo et al. | |
| 5,876,301 | A | 3/1999 | Tabata et al. | |
| 5,944,765 | A | 8/1999 | Saito et al. | |
| 6,220,219 | B1 * | 4/2001 | Wadas et al. | 123/352 |
| 6,705,971 | B2 * | 3/2004 | Kayano et al. | 477/110 |
| 2004/0014563 | A1 * | 1/2004 | Janasek et al. | 477/109 |
| 2004/0106498 | A1 | 6/2004 | Badillo et al. | |
| 2006/0068975 | A1 | 3/2006 | Kobayashi et al. | |

FOREIGN PATENT DOCUMENTS

| | | |
|---|---|---|
| JP | 04-012141 A | 1/1992 |
| JP | 05-026065 A | 2/1993 |
| JP | 07-034916 A | 2/1995 |
| JP | 2832632 B2 | 12/1998 |
| JP | 2001-140668 A | 5/2001 |
| JP | 2002-139142 A | 5/2002 |

OTHER PUBLICATIONS

Official communication issued in counterpart European Application No. 07022147.8, mailed on Feb. 6, 2008. Watanabe; "Control System and Vehicle Including the Same"; U.S. Appl. No. 11/940,489; filed Nov. 15, 2007.
Watanabe, "Control System and Vehicle," U.S. Appl. No. 11/940,489, filed on Nov. 15, 2007.
Watanabe et al., "Engine Output Adjustment System and Vehicle Including the Same," U.S. Appl. No. 11/955,589, filed on Dec. 13, 2007.

\* cited by examiner

*Primary Examiner* — Sherry Estremsky
(74) *Attorney, Agent, or Firm* — Keating & Bennett, LLP

(57) ABSTRACT

A motorcycle includes a transmission, an ECU, an engine and a transmission operating mechanism. The engine has a crank. The transmission operating mechanism includes a shift pedal and a load sensor. The load sensor detects an operation of the shift pedal by a driver, and applies a detected value to the ECU. The ECU decreases an output of the engine when a torque (driving force) having at least a predetermined value is transmitted from the crank to the transmission when a shift operation of the driver is detected by the load sensor. Moreover, the ECU does not decrease the output when the torque transmitted from the crank to the transmission is less than the predetermined value when the shift operation of the driver is detected by the load sensor.

14 Claims, 12 Drawing Sheets

DRIVING STATE

DRIVEN STATE

DRIVING STATE DETERMINATION DATA

A : BOUNDARY REGION
B : DRIVING REGION
C : DRIVEN REGION

CONTROL SYSTEM AND VEHICLE

BACKGROUND OF THE INVENTION

1. Field of the Invention

The present invention relates to a control system that assists a shifting operation of a transmission and a vehicle including the same.

2. Description of the Related Art

When operating a gearshift in a vehicle with a manual transmission, first, a driver usually disconnects a clutch. Thus, power transmission from a crankshaft of an engine to a main shaft of the transmission is stopped, so that gears are easily disconnected. In this state, the driver performs a shifting operation and changes gear positions. Finally, the driver connects the clutch, so that the power is transmitted from the crankshaft to the main shaft. In this way, the gearshift is completed.

During a race or other high speed activities, the gearshift is required to be operated quickly. Therefore, in some situations, the driver operates the gearshift without a clutch operation (hereinafter referred to as "clutchless shifting"). In such situations, since the gearshift is operated while the power is being transmitted from the crankshaft to the main shaft, it is difficult to disconnect the gears. Thus, the driver must adjust an output of the engine so that the gears can be easily disconnected.

The adjustment of the output of the engine, described above, is difficult for a less skilled driver. Therefore, if the less skilled driver performs the clutchless shifting, in some cases, the gearshift cannot be performed smoothly.

Conventionally, a device that controls the output of the engine during the clutchless shifting has been developed (see JP 2813009 B, for example).

In a transmission device for the vehicle described in JP 2813009 B, when an up-shifting operation is performed by the driver and a torque is transmitted from the engine to a drive wheel, an output torque of the engine is temporarily decreased. Accordingly, a transmission torque of a transmission mechanism is decreased, so that the up-shifting can be performed without the clutch operation.

In addition, when a down-shifting operation is performed by the driver and the torque is transmitted from the drive wheel to the engine, the output torque of the engine is temporarily increased. Thus, the transmission torque of the transmission mechanism is decreased, so that the down-shifting can be performed without the clutch operation.

In the transmission device for the vehicle of the above-described JP 2813009 B, a determination as to whether the output torque of the engine is increased or decreased is made based on transmission directions of the torque that is detected by a torque direction sensor.

However, if the output torque of the engine is adjusted based on the transmission directions of the torque, unnecessary adjustments of the torque are performed in some cases. This produces uncomfortable feelings to the driver.

SUMMARY OF THE INVENTION

In order to overcome the problems described above, preferred embodiments of the present invention provide a control system that enables comfortable driving of a vehicle with outstanding drivability, and the vehicle including the same.

According to a preferred embodiment of the present invention, a control system that adjusts an output of an engine in a vehicle including a transmission that transmits a torque generated by the engine depending on an accelerator operation amount to a drive wheel includes a detector that detects a shift operation of the transmission by a driver, and an engine output adjuster that, when the shift operation of the transmission is detected by the detector, decreases the output of the engine when the torque is at least a first value in a driving state where the torque is transmitted from the engine to the transmission and does not decrease the output when the torque is less than the first value in the driving state.

According to the control system, the shift operation of the transmission is detected by the detector. The output of the engine is decreased by the engine output adjuster when a (transmitted) torque is at least the first value in the driving state where the torque is transmitted from the engine to the transmission when the shift operation is detected by the detector. Moreover, the output of the engine is not decreased when the torque is less than the first value in the driving state when the shift operation is detected by the detector.

In this case, since the output of the engine is decreased when the driver performs the shift operation in the driving state, the torque transmitted between an input shaft and an output shaft of the transmission is decreased. This decreases the engaging force of a gear on the input shaft side with a gear on the output shaft side in the transmission, so that those gears can be easily moved away from each other. As a result, the driver can easily perform the clutchless shifting.

Furthermore, the output of the engine is not decreased when the torque is less than the first value in the driving state. Here, when the torque is less than the first value in the driving state, the torque transmitted between the input shaft and the output shaft in the transmission is small. In this case, a large engaging force of the gear on the input shaft side with the gear on the output shaft side in the transmission is not generated. Accordingly, the driver can easily perform the clutchless shifting even though the output of the engine is not decreased. In this case, shock in the vehicle due to the decrease in the output of the engine does not occur. This prevents the uncomfortable feelings experienced by the driver and improves the drivability of the vehicle.

The results described above enable comfortable driving of the vehicle.

The engine output adjuster may not decrease the output regardless of the value of the torque in the driving state when a rotation speed of the engine is less than a second value when the shift operation of the transmission is detected by the detector.

In this case, the transmission is brought into the state where the gearshift is difficult to operate when the vehicle is driven at a low speed. This prevents a rapid change in the speed of the vehicle during the low speed driving. As a result, a drive wheel is prevented from slipping, and the drivability of the vehicle is improved.

The engine output adjuster may not decrease the output regardless of the value of the torque in the driving state when a speed of the vehicle is less than a third value when the shift operation of the transmission is detected by the detector.

In this case, the transmission is brought into the state where the gearshift is difficult to operate when the vehicle is driven at the low speed. This prevents the rapid change in the speed of the vehicle during the low speed driving. As a result, the drive wheel is prevented from slipping, and the drivability of the vehicle is improved.

When the down-shifting operation of the transmission is detected by the detector, the engine output adjuster may increase the output of the engine when the torque is at least a fourth value in a driven state where the torque is transmitted from the transmission to the engine and the engine output adjuster may not increase the output when the torque is less than the fourth value in the driven state.

According to this control system, the output of the engine is increased by the engine output adjuster when the (transmitted) torque is at least the fourth value in the driven state where the torque is transmitted from the transmission to the engine when the down-shifting operation is detected by the detector. Moreover, the output of the engine is not increased when the torque is smaller than the fourth value in the driven state when the down-shifting operation is detected by the detector.

In this case, since the output of the engine is increased when the driver performs the down-shifting operation in the driven state, the torque transmitted between the input shaft and the output shaft of the transmission is decreased. Thus, the engaging force of the gear on the input shaft side with the gear on the output shaft side in the transmission is decreased, so that the gears can be easily moved away from each other. This enables the driver to easily perform the clutchless shifting.

In addition, the output of the engine is not increased when the torque is less than the fourth value in the driven state. Here, when the torque is less than the fourth value in the driven state, the torque transmitted between the input shaft and the output shaft of the transmission is small. In this case, a large engaging force of the gear on the input shaft side with the gear on the output shaft side in the transmission is not generated. Accordingly, the driver can easily perform the clutchless shifting even though the output of the engine is not increased. In this case, the shock in the vehicle due to the increase of the output of the engine does not occur. This prevents the driver from having uncomfortable feelings, and improves the drivability of the vehicle.

The results above enable comfortable driving of the vehicle.

The engine output adjuster may not increase the output regardless of the value of the torque in the driven state or the value of the torque in the driving state when the rotation speed of the engine is less than the second value when the down-shifting operation of the transmission is detected by the detector.

In this case, the transmission is brought into the state where the gearshift is difficult to operate when the vehicle is driven at the low speed. In addition, a rapid increase in the output of the engine is prevented during the low speed driving. These conditions prevent a rapid increase in the speed of the vehicle during the low speed driving. As a result, the drive wheel is prevented from slipping and the drivability of the vehicle is improved.

The engine output adjuster may not increase the output regardless of the value of the torque in the driven state or the value of the torque in the driving state when the speed of the vehicle is less than the third value when the down-shifting operation of the transmission is detected by the detector.

In this case, the transmission is brought into the state where the gearshift is difficult to operate when the vehicle is driven at the low speed. Furthermore, the rapid increase in the output of the engine is prevented during the low speed driving. Thus, the rapid increase in the speed of the vehicle is prevented during the low speed driving. As a result, the drive wheel is prevented from slipping and the drivability of the vehicle is improved.

The control system may further include a notifier that provides notification to urge the driver to stop the shift operation when the torque in the driven state is at least the fourth value when the up-shifting operation of the transmission is detected by the detector.

In this case, the driver can easily recognize that the transmission is in the state where the gearshift is difficult to operate by confirming the notifier. Thus, the driver can stop the shift operation quickly. As a result, the drivability of the vehicle is further improved.

The control system may further include a throttle valve for adjusting an amount of air introduced into the engine, and the engine output adjuster may determine whether or not the torque is at least the first value based on the rotation speed of the engine and an opening of the throttle valve.

In this case, since a device for detecting the torque transmitted between the engine and the transmission is not required, the control system can be simply constructed. This reduces the cost of the vehicle.

The first value may be preset based on the rotation speed of the engine and the opening of the throttle valve.

In this case, the first value can be appropriately set depending on the rotation speed of the engine and the opening of the throttle valve. Thus, the driver can perform the clutchless shifting easily and reliably.

The control system may further include a throttle valve for adjusting an amount of air introduced into the engine, and the engine output adjuster may determine whether or not the torque is at least the fourth value based on the rotation speed of the engine and an opening of the throttle valve.

In this case, since the device for detecting the torque transmitted between the engine and the transmission is not required, the control system can be simply constructed. This reduces the cost of the vehicle.

The fourth value may be preset based on the rotation speed of the engine and the opening of the throttle valve.

In this case, the fourth value can be appropriately set depending on the rotation speed of the engine and the opening of the throttle valve. Accordingly, the driver can perform the clutchless shifting easily and reliably.

According to another preferred embodiment of the present invention, a vehicle includes a drive wheel, an engine that generates a torque for turning the drive wheel depending on an accelerator operation amount, a transmission that transmits the torque generated by the engine to the drive wheel, and a control system that adjusts an output of the engine, wherein the control system includes a detector that detects a shift operation of the transmission by a driver, and an engine output adjuster that, when the shift operation of the transmission is detected by the detector, decreases the output of the engine when the torque is at least a first value in a driving state where the torque is transmitted from the engine to the transmission and does not decrease the output when the torque is less than the first value in the driving state.

According to the vehicle, the torque generated by the engine is transmitted to the drive wheel through the transmission. Thus, the drive wheel is driven.

Furthermore, the shift operation of the transmission is detected by the detector in the control system. Then, the output of the engine is decreased by the engine output adjuster when the (transmitted) torque is at least the first value in the driving state where the torque is transmitted from the engine to the transmission when the shift operation is detected by the detector. Moreover, the output of the engine is not decreased when the torque is less than the first value in the driving state when the shift operation is detected by the detector.

In this case, since the output of the engine is decreased when the driver performs the shift operation in the driving state, the torque transmitted between the input shaft and the output shaft of the transmission is decreased. Thus, the engaging force of the gear on the input shaft side with the gear on the output shaft side in the transmission is decreased, so that the gears can be easily moved away from each other. As a result, the driver can easily perform the clutchless shifting.

Furthermore, the output of the engine is not decreased when the torque is less than the first value in the driving state. Here, when the torque is less than the first value in the driving state, the torque transmitted between the input shaft and the output shaft of the transmission is small. In this case, a large engaging force of the gear on the input shaft side with the gear on the output shaft side in the transmission is not generated. Thus, the driver can easily perform the clutchless shifting even though the output of the engine is not decreased. In this case, the shock in the vehicle due to the decrease in the output of the engine does not occur. This prevents the driver from having uncomfortable feelings, and improves the drivability of the vehicle.

The results above enable comfortable driving of the vehicle.

Other features, elements, characteristics, and advantages of the present invention will become more apparent from the following description of preferred embodiments of the present invention with reference to the attached drawings.

DETAILED DESCRIPTION OF THE PREFERRED EMBODIMENTS

A control system and a vehicle including the same according to preferred embodiments of the present invention will now be described with reference to the drawings. Note that a motorcycle as an example of the vehicle will be described below.

(1) General Structure of a Motorcycle

Figure 1:
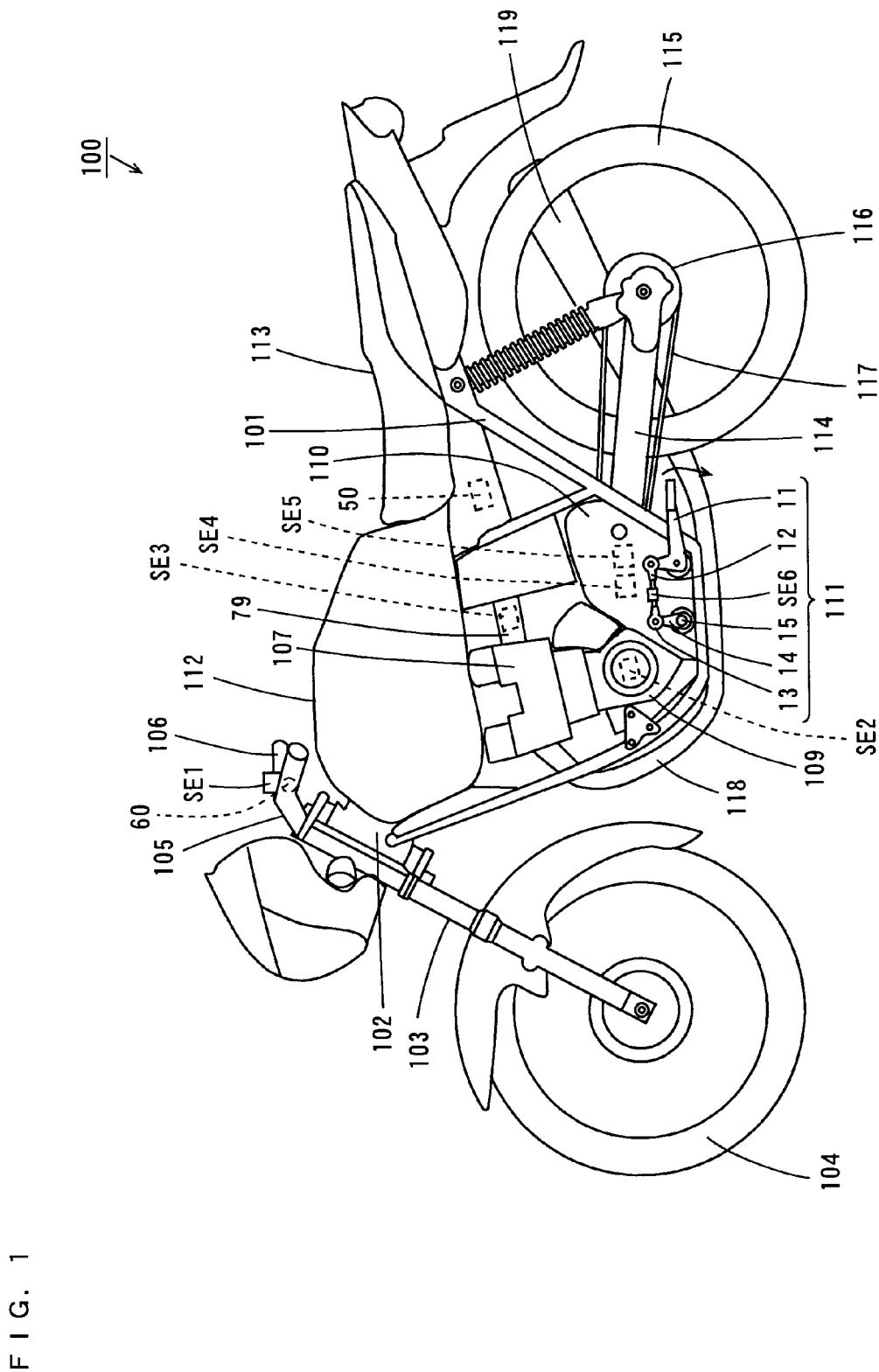
FIG. 1 is a schematic side view of a motorcycle.

FIG. 1 is a schematic side view of a motorcycle according to the present preferred embodiment.

In the motorcycle 100 of FIG. 1, a head pipe 102 is provided at the front end of a main body frame 101. A front fork 103 is provided at the head pipe 102 so as to be able to swing from side to side. At the lower end of the front fork 103, a front wheel 104 is rotatably supported. A handle 105 is provided at the upper end of the head pipe 102.

The handle 105 is provided with an accelerator grip 106, an accelerator opening sensor SE1 and a notification lamp 60. The accelerator opening sensor SE1 detects an operation amount of the accelerator grip 106 by a driver (hereinafter referred to as "an accelerator opening"). The notification lamp 60 will be described later.

An engine 107 is provided at the center of the body frame 101. An intake pipe 79 and an exhaust pipe 118 are attached to the engine 107. A crankcase 109 is attached to the lower portion of the engine 107. A crank angle sensor SE2 is provided in the crankcase 109. The crank angle sensor SE2 detects the rotation angle of a crank 2, described later (see FIG. 2 and FIG. 5), of the engine 107.

A throttle sensor SE3 is provided in the intake pipe 79. The throttle sensor SE3 detects the opening of an electronically controlled throttle valve (ETV) 82 (see FIG. 5), described later.

A transmission case 110 coupled to the crankcase 109 is provided at the lower portion of the body frame 101. A shift cam rotation angle sensor SE4, a drive shaft rotation speed sensor SE5 as well as a transmission 5 (see FIG. 2) and a shift mechanism 7 (see FIG. 2), described later, are provided in the transmission case 110.

The shift cam rotation angle sensor SE4 detects the rotation angle of a shift cam 7b (see FIG. 2), described later. The drive shaft rotation speed sensor SE5 detects the rotation speed of a drive shaft 5b (see FIG. 2), described later. Details of the transmission 5 and the shift mechanism 7 will be described later.

A transmission operating mechanism 111 is provided on the side portion of the transmission case 110. The transmission operating mechanism 111 includes a shift pedal 11, a first coupling arm 12, a load sensor SE6, a second coupling arm 13, a pivot arm 14 and a pivot shaft 15. One end of the pivot shaft 15 is fixed to the pivot arm 14, and the other end thereof is coupled to the shift mechanism 7 (see FIG. 2), described later.

For example, when up-shifting the transmission 5, the driver depresses the shift pedal 11 to turn it in a clockwise direction (the direction indicated by the arrow in FIG. 1). Accordingly, the first and second coupling arms 12, 13 move towards the back of the motorcycle 100, and the pivot arm 14 and the pivot shaft 15 turn in the clockwise direction. As a result, the shift mechanism 7 is operated, so that the transmission 5 is shifted up. Note that the shift pedal 11 is turned in a counterclockwise direction to shift down the transmission 5. Thus, the pivot shaft 15 is turned in the direction opposite to the direction described above (the counterclockwise direction). As a result, the shift mechanism 7 is operated, so that the transmission 5 is shifted down.

The load sensor SE6 preferably includes a load cell such as an elastic load cell (a strain gauge type, an electrostatic capacitance type or the like) or a magnetostrictive load cell, for example, and detects a tensile load and a compressive load acting on the load sensor SE6. When the driver turns the shift pedal 11 in the clockwise direction (an up-shifting operation), the tensile load acts on the load sensor SE6. When the driver turns the shift pedal 11 in the counterclockwise direction (a down-shifting operation), the compressive load acts on the load sensor SE6.

A fuel tank 112 is provided above the engine 107 and a seat 113 is provided in the rear of the fuel tank 112. An ECU (Electronic Control Unit) 50 is provided under the seat 113.

Figure 5:
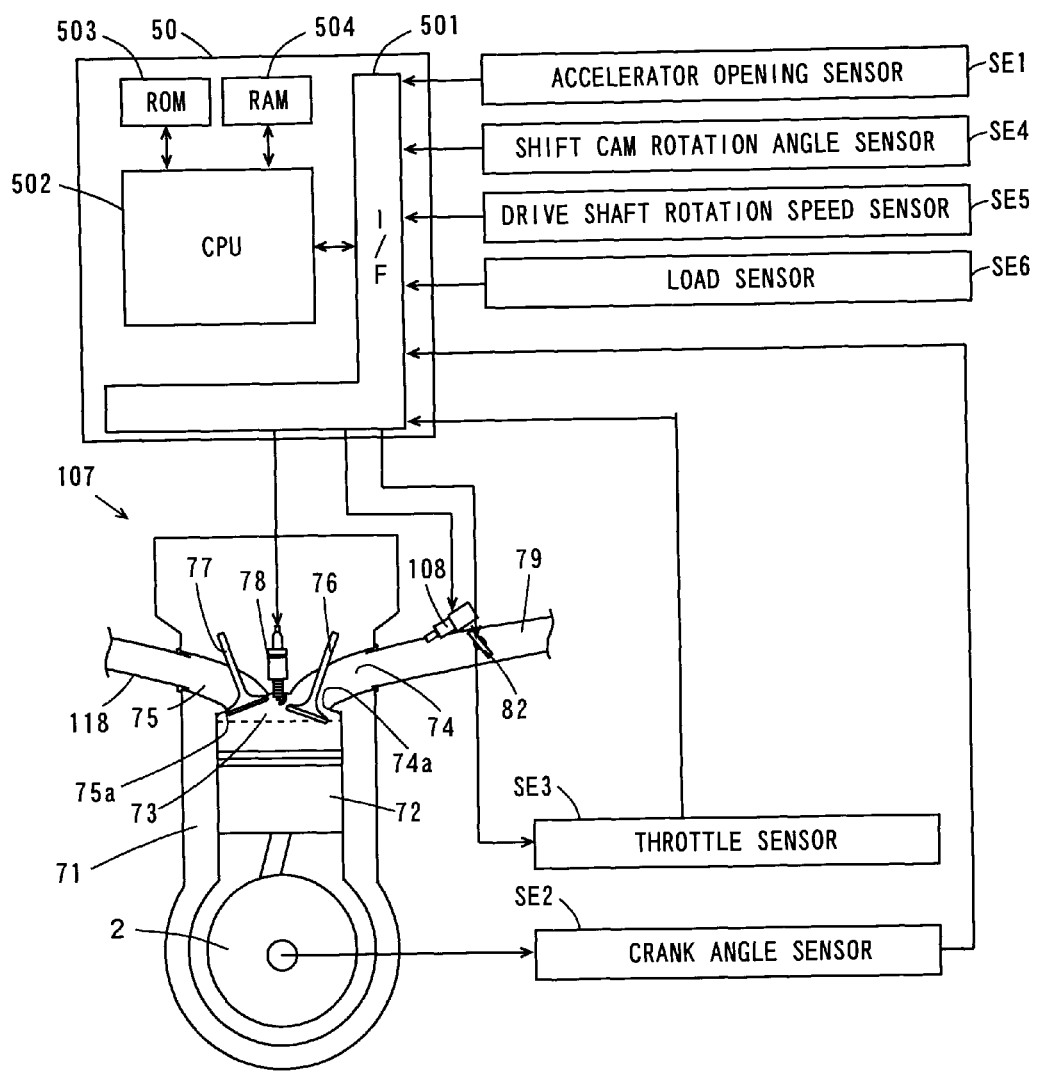
FIG. 5 is a diagram showing a schematic structure of each part related to an engine and a control of an output of the engine.

As shown in FIG. 5, the ECU 50 includes an I/F (interface) 501, a CPU (central processing unit) 502, a ROM (read only memory) 503 and a RAM (random access memory) 504. Values detected by the above sensors SE1-SE6 are applied to the CPU 502 via the I/F 501.

The CPU 502 controls the operation of the engine 107 based on the values detected by the respective sensors SE1-SE6, as described later. The ROM 503 stores a control program for the CPU 502. The RAM 504 functions as a work area for the CPU 502 while storing a first to sixth threshold values and the like, described later.

A rear arm 114 is connected to the body frame 101 so as to extend to the rear of the engine 107. A rear wheel 115 and a rear wheel driven sprocket 116 are rotatably held by the rear arm 114. A chain 117 is attached to the rear wheel driven sprocket 116.

One end of an exhaust pipe 118 is attached to an exhaust port of the engine 107. The other end of the exhaust pipe 118 is attached to a muffler 119.

(2) Transmission Mechanism

Figure 2:
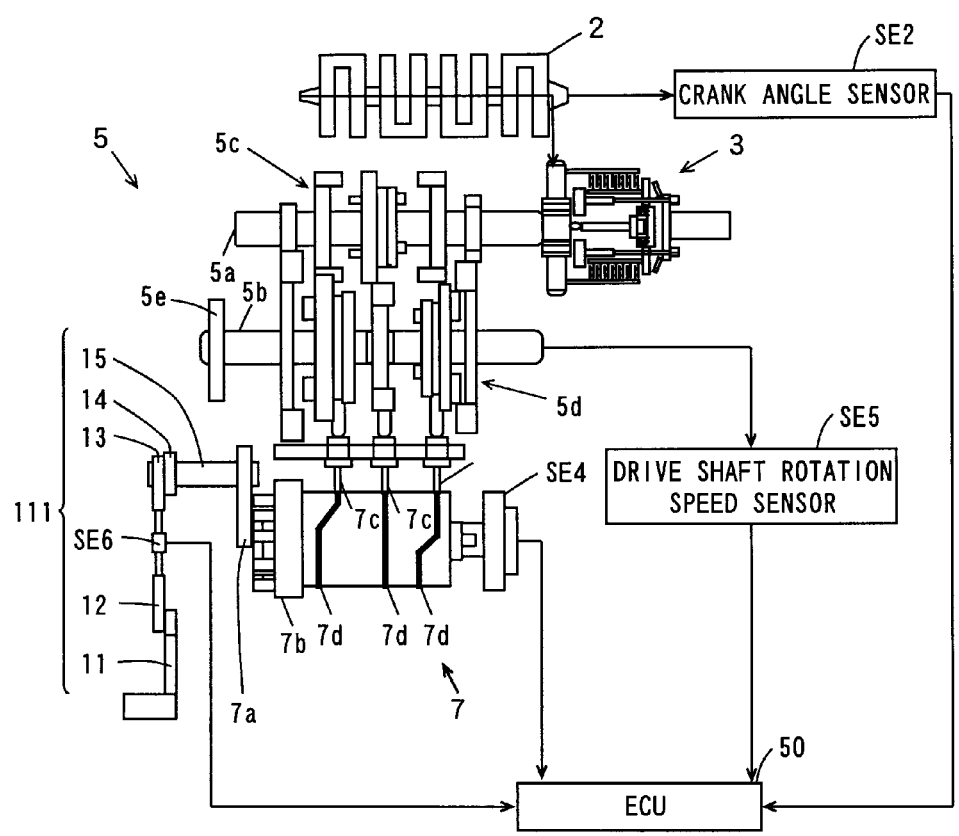
FIG. 2 is a diagram explaining structures of a transmission and a shift mechanism provided in the motorcycle of FIG. 1.

FIG. 2 is a diagram explaining the structures of the transmission and the shift mechanism provided in the transmission case 110 of FIG. 1.

As shown in FIG. 2, the transmission 5 includes a main shaft 5a and the drive shaft 5b. A plurality of transmission gears 5c are mounted on the main shaft 5a, and a plurality of transmission gears 5d and a rear wheel drive sprocket 5e are mounted on the drive shaft 5b. The chain 117 of FIG. 1 is attached to the rear wheel drive sprocket 5e.

The torque (driving force) generated by the engine 107 of FIG. 1 is transmitted to a clutch 3 through the crank 2 of FIG. 2. The torque is further transmitted from the clutch 3 to the main shaft 5a of the transmission 5. The torque is further transmitted from the main shaft 5a to the drive shaft 5b through the transmission gears 5c, 5d. The torque is further transmitted from the drive shaft 5b to the rear wheel 115 (FIG. 1) through the rear wheel drive sprocket 5e, the chain 117 (FIG. 1) and the rear wheel driven sprocket 116 (FIG. 1). Accordingly, the rear wheel 115 is rotated.

Figure 3A:
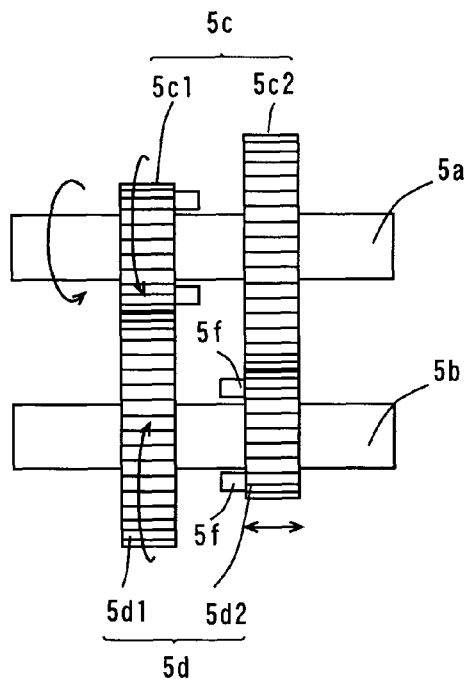
FIGS. 3A and 3B are schematic diagrams showing a structure in which a torque is transmitted from a main shaft to a drive shaft.
Figure 3B:
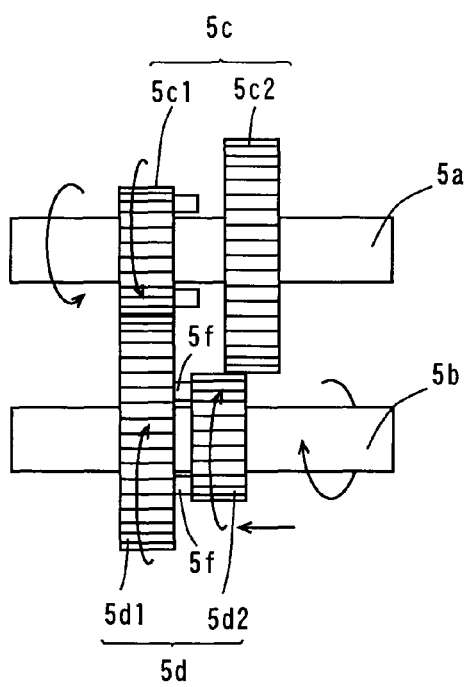

FIGS. 3A and 3B are schematic diagrams showing the structure in which the torque is transmitted from the main shaft 5a to the drive shaft 5b.

Note that transmission gears 5c1 and 5c2 of the plurality of transmission gears 5c and transmission gears 5d1 and 5d2 of the plurality of transmission gears 5d are shown in FIGS. 3A and 3B.

The transmission gear 5c1 is mounted on the main shaft 5a in a serration structure. That is, the transmission gear 5c1 is movable in the axial direction of the main shaft 5a, while being fixed to the main shaft 5a in the rotational direction of the main shaft 5a. Therefore, the rotation of the main shaft 5a causes the transmission gear 5c1 to rotate. The transmission gear 5c2 is rotatably mounted on the main shaft 5a while being inhibited from moving in the axial direction of the main shaft 5a.

The transmission gear 5d1 is rotatably mounted on the drive shaft 5b while being inhibited from moving in the axial direction of the drive shaft 5b. When the transmission gear 5c1 and the transmission gear 5d1 are engaged with each other, the rotation of the main shaft 5a causes the transmission gear 5d1 to rotate as shown in FIG. 3A.

The transmission gear 5d2 is mounted on the drive shaft 5b in the serration structure. That is, the transmission gear 5d2 is movable in the axial direction of the drive shaft 5b while being fixed to the drive shaft 5b in the rotational direction of the drive shaft 5b. Therefore, the rotation of the transmission gear 5d2 causes the drive shaft 5b to rotate.

As shown in FIG. 3A, when the transmission gear 5d2 is spaced apart from the transmission gear 5d1, the transmission gear 5d1 is not fixed to the drive shaft 5b in the rotational direction of the drive shaft 5b. In this case, the rotation of the main shaft 5a causes the transmission gear 5d1 to rotate, but does not cause the drive shaft 5b to rotate. This state where the torque (driving force) is not transmitted from the main shaft 5a to the drive shaft 5b is referred to as the state where the gears are in neutral positions.

As shown in FIG. 3B, the transmission gear 5d2 moves in the axial direction to be proximate to the transmission gear 5d1, so that convex-shaped dogs 5f provided on a side surface of the transmission gear 5d2 engage with concave-shaped dog holes provided on a side surface of the transmission gear 5d1 (not shown). In this way, the transmission gears 5d1 and 5d2 are fixed to each other. In this case, the rotation of the main shaft 5a causes the transmission gear 5d2 to rotate together with the transmission gear 5d1. Accordingly, the drive shaft 5b is rotated.

Note that when the transmission gear 5c1 in the state of FIG. 3A is moved to the proximity of the transmission gear 5c2 to be fixed to the transmission gear 5c2, the transmission gear 5c2 rotates with the transmission gear 5c1. In this case, the transmission gear 5d2 is rotated in accordance with the rotation of the transmission gear 5c2. Thus, the drive shaft 5b is rotated. Hereinafter, transmission gears, such as the transmission gears 5c1, 5d2, which move in the axial direction on the main shaft 5a or the drive shaft 5b will be referred to as sliding gears. In addition, transmission gears, such as the transmission gears 5c2, 5d1, which are inhibited from moving in the axial direction of the main shaft 5a or the drive shaft 5b will be referred to as fixed gears.

In the transmission 5, a transmission path of the torque (driving force) from the main shaft 5a to the drive shaft 5b can be changed by moving the sliding gears to change the combination of the sliding gears and the fixed gears, as described above. Thus, the rotational speed of the drive shaft 5b can be changed. Note that the sliding gears are moved by a shift arm 7a, described later.

As shown in FIG. 2, the shift mechanism 7 includes the shift arm 7a, the shift cam 7b and a plurality of shift forks 7c. One end of the shift arm 7a is fixed to the pivot shaft 15 and the other end is coupled to one end of the shift cam 7b. A plurality of cam grooves 7d are formed in the shift cam 7b. The plurality of shift forks 7c are attached to the plurality of cam grooves 7d, respectively. The shift cam rotation angle sensor SE4 is provided at the other end of the shift cam 7b.

As described above, when the driver turns the shift pedal 11, the pivot shaft 15 is turned accordingly. With the pivot shaft 15 turned, the shift arm 7a is turned at one end as a central axis. This causes the shift cam 7b to turn.

The turn of the shift cam 7b causes the shift forks 7c to move along the cam grooves 7d, respectively. Accordingly, the sliding gears are moved, so that the transmission path of the torque (driving force) from the main shaft 5a to the drive shaft 5b is changed. That is, a gear ratio of the transmission 5 is changed.

(3) Relationship Between the Engine Output and the Transmission Gears

In general, when shifting the gears of the transmission 5 (hereinafter referred to as "the gearshift"), the driver operates a clutch lever (not shown) to disconnect the clutch 3 (FIG. 2). Thus, the transmission of the torque between the crank 2 (FIG. 2) and the main shaft 5a is stopped. The driver operates the shift pedal 11 in this state (hereinafter referred to as "the shifting operation"). This enables the driver to smoothly operate the gearshift. The reason will be described with reference to the drawings.

As described above, the convex-shaped dogs are formed on the sliding gears of the plurality of transmission gears 5c, 5d, and the concave-shaped dog holes, with which the dogs are engaged are formed on the fixed gears of the plurality of transmission gears 5c, 5d.

Figure 4A:
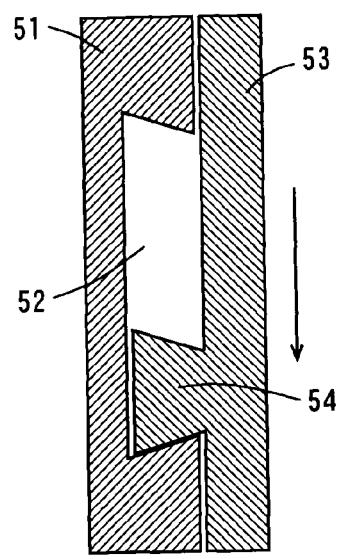
FIGS. 4A to 4C are diagrams showing a relationship between a dog of a sliding gear and a dog hole of a fixed gear.
Figure 4B:
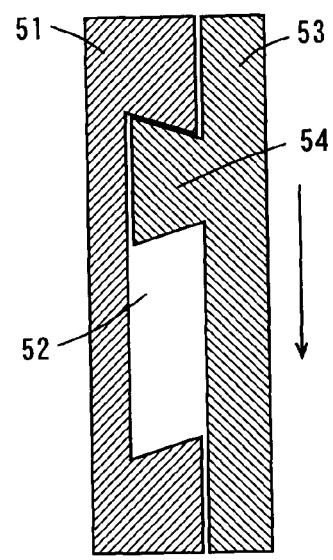
Figure 4C:
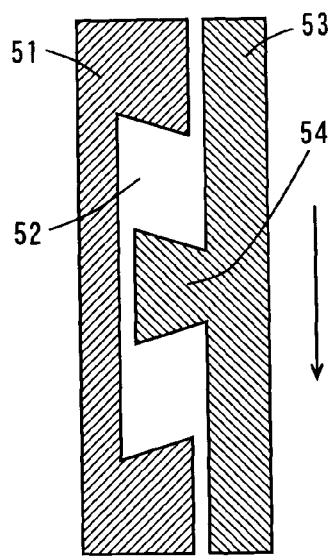

FIGS. 4A to 4C are diagrams showing the relationship between a dog of a sliding gear and a dog hole of a fixed gear. Note that FIGS. 4A to 4C schematically show sectional views of the portion in which the dog of the sliding gear and the dog hole of the fixed gear are formed. In addition, it is assumed that the portion of the sliding gear and the fixed gear shown in FIGS. 4A and 4C will move (rotate) in the direction indicated by the arrow.

FIG. 4A shows a case in which the torque is applied from the crank 2 (FIG. 2) to the main shaft 5a (FIG. 2), and FIG. 4B shows a case in which the torque is applied from the main shaft 5a to the crank 2. Hereinafter, the case in which the torque is applied from the crank 2 to the main shaft 5a (the state of FIG. 4A) is referred to as a driving state of the engine 107, and the opposite case (the state of FIG. 4B) is referred to as a driven state of the engine 107. For example, the engine 107 is in the driving state when the motorcycle 100 is accelerated, and the engine 107 is in the driven state when the motorcycle 100 is decelerated. That is, the driven state of the engine 107 is a state in which an engine brake is applied.

As shown in FIGS. 4A to 4C, the dog hole 52 having a trapezoidal shape in cross section with its width increasing toward the bottom surface is formed on the fixed gear 51. Moreover, the dog 54 having an inverted trapezoidal shape in cross section with its width increasing toward a tip portion thereof is formed on the sliding gear 53.

In the driving state of the engine 107, a front side surface of the dog 54 in the moving direction thereof abuts against a front side surface of the dog hole 52 in the moving direction thereof, as shown in FIG. 4A. Accordingly, the tuning force of the sliding gear 53 is transmitted to the fixed gear 51 through the dog 54. In this case, a large engaging force is generated in the contact surface of the dog hole 52 and the dog 54. Thus, it is difficult to move the sliding gear 53 in a direction away from the fixed gear 51.

Here, when the driver disconnects the clutch 3 (FIG. 2), the transmission of the torque from the crank 2 (FIG. 2) to the main shaft 5a (FIG. 2) is stopped. In this case, the main shaft 5a is rotated by inertia. Accordingly, the engagement of the dog hole 52 with the dog 54 is released as shown in FIG. 4C. This enables the sliding gear 53 to move in the direction away from the fixed gear 51, so that the gearshift can be smoothly performed.

Furthermore, in the driven state of the engine 107, a rear side surface of the dog 54 in the moving direction thereof abuts against a rear side surface of the dog hole 52 in the moving direction thereof, as shown in FIG. 4B. Accordingly, the torque of the fixed gear 51 is transmitted to the sliding gear 53 through the dog 54. As described above, since the engine brake is applied in the driven state of the engine 107, the rotation of the fixed gear 51 is restricted by the sliding gear 53. In this case, the large engaging force is generated in the contact surface of the dog hole 52 and the dog 54. Thus, it is difficult to move the sliding gear 53 in the direction away from the fixed gear 51.

Here, when the driver disconnects the clutch 3 (FIG. 2), the transmission of the torque between the crank 2 (FIG. 2) and the main shaft 5a (FIG. 2) is stopped. In this case, the engine brake is released, so that the main shaft 5a is rotated by inertia. Thus, the engagement between the dog hole 52 and the dog 54 is released as shown in FIG. 4C. This enables the sliding gear 53 to move in the direction away from the fixed gear 51, so that the gearshift can be performed smoothly.

(4) Control of the Output of the Engine

In the present preferred embodiment, the CPU 502 of the ECU 50 (FIG. 5) adjusts the output of the engine 107 based on the values detected by the above mentioned sensors SE1-SE6. Thus, the fixed gear 51 and the sliding gear 53 can be brought into the state shown in FIG. 4C without disconnecting the clutch 3 (FIG. 2). As a result, the driver can operate the gearshift smoothly without disconnecting the clutch 3. That is, the clutchless shifting can be performed smoothly. Details will now be described.

(4-1) Relationship Between the Engine and Each Part

FIG. 5 is a diagram showing a schematic structure of each part related to the engine 107 and the control of the output of the engine 107.

As shown in FIG. 5, the engine 107 includes a cylinder 71, in which a piston 72 is provided so as to be able to move up and down. In addition, a combustion chamber 73 is formed in the upper portion inside the cylinder 71. The combustion chamber 73 communicates with the outside of the engine 107 through an intake port 74 and an exhaust port 75.

An intake valve 76 capable of opening and closing is provided at a downstream open end 74a of the intake port 74, and an exhaust valve 77 capable of opening and closing is provided at an upstream open end 75a of the exhaust port 75. The intake valve 76 and the exhaust valve 77 are driven by a conventional cam mechanism. Above the combustion chamber 73, an ignition plug 78 is provided to perform a spark ignition in the combustion chamber 73.

The intake pipe 79 and the exhaust pipe 118 are attached to the engine 107 so as to communicate with the intake port 74 and the exhaust port 75, respectively. The injector 108 for supplying a fuel into the cylinder 71 is provided in the intake pipe 79. In addition, the electronically controlled throttle valve (ETV) 82 is provided in the intake pipe 79.

In the actuation of the engine 107, air is taken from the intake port 74 into the combustion chamber 73 through the intake pipe 79 while the fuel is supplied into the combustion chamber 73 by the injector 108. Accordingly, a fuel-air mixture is produced in the combustion chamber 73, and the spark ignition is performed on the air-fuel mixture by the ignition plug 78. A burned gas produced by the combustion of the fuel-air mixture in the combustion chamber 73 is exhausted from the exhaust port 75 through the exhaust pipe 118.

The values detected by the accelerator opening sensor SE1, the crank angle sensor SE2, the throttle sensor SE3, the shift cam rotation angle sensor SE4, the drive shaft rotation speed sensor SE5 and the load sensor SE6 are applied to the ECU 50.

(4-2) Control Operation of the CPU (a) Outline

In the present preferred embodiment, the CPU 502 of the ECU 50 (FIG. 5) adjusts a throttle opening of the ETV 82 based on the detected value of the accelerator opening sensor SE1 in a normal operation. Thus, the output of the engine 107 is adjusted to be a value depending on the accelerator opening. Note that the relationship between the accelerator opening and a throttle opening (the output of the engine) is stored in the ROM 503 or the RAM 504 of FIG. 5.

Moreover, the CPU 502 detects the shift operation performed by the driver based on the detected value of the load sensor SE6. Then, when detecting the shift operation by the driver, the CPU 502 determines in which state the engine 107 is among the driving state, the driven state and a boundary state (the intermediate state between the driving state and the driven state), described later, based on the values detected by the crank angle sensor SE2 and the throttle sensor SE3. Based on this determination, the CPU 502 adjusts the output of the engine 107. In addition, the CPU 502 determines whether or not the gearshift is completed based on the value detected by the shift cam rotation angle sensor SE4 and finishes the output adjustment of the engine 107 if the gearshift is determined to be completed.

For example, when the up-shifting operation or the down-shifting operation is performed by the driver while the engine 107 is in the driving state, the output of the engine 107 is temporarily decreased by the CPU 502. Specifically, the output of the engine 107 is temporarily decreased by the CPU 502 so as to be less than the output of the engine 107 that is determined based on the accelerator opening at the time.

Alternatively, when the down-shifting operation is performed by the driver while the engine 107 is in the driven state, the output of the engine 107 is temporarily increased by the CPU 502. Specifically, the output of the engine 107 is temporarily increased by the CPU 502 so as to be greater than the output of the engine 107 that is determined based on the accelerator opening at the time. Note that the output adjustment of the engine 107 is not performed by the CPU 502 while the engine 107 is in the boundary state.

Note that the CPU 502 decreases the output of the engine 107 by, for example, stopping the spark ignition of the fuel-air mixture performed by the ignition plug 78 (FIG. 5), retarding an ignition timing, or decreasing a throttle opening of the ETV 82 (FIG. 5). Furthermore, the CPU 502 increases the output of the engine 107 by, for example, increasing the throttle opening of the ETV 82.

Details of the control operation of the CPU 502 will be described with reference to the drawings.

(b) Determination Method of the Driving State, the Boundary State and the Driven State First, a determination method of the state of the engine 107 (the driving state, the boundary state and the driven state) is described. In the present preferred embodiment, the CPU 502 determines in which state the engine 107 is among the driving state, the boundary state and the driven state based on data that show the relationship between the rotation speed of the engine 107 (FIG. 5) with no load and the throttle opening of the ETV 82 (FIG. 5) (hereinafter referred to as "the driving state determination data").

Figure 6:
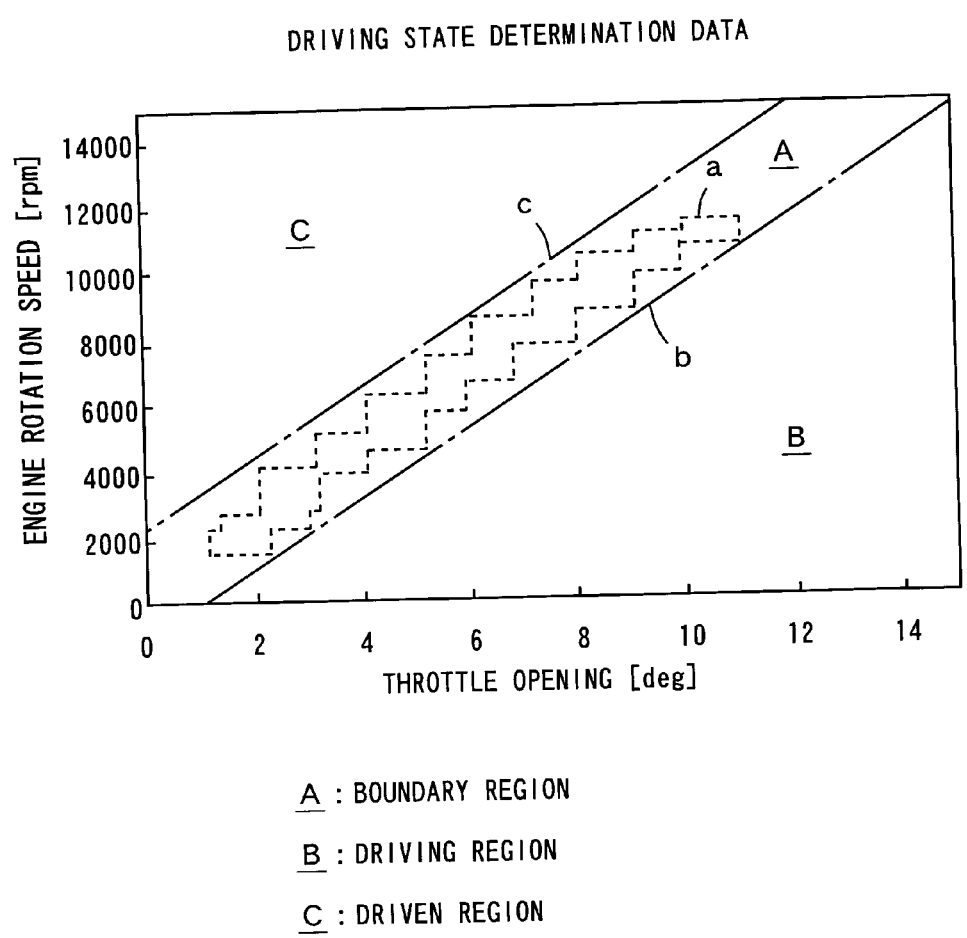
FIG. 6 is a diagram showing an example of drive state determination data stored in a RAM of an ECU.

FIG. 6 is a diagram showing an example of the driving state determination data stored in the RAM 504 (ROM 503) of the ECU 50. In FIG. 6, the ordinate represents the rotation speed of the engine 107, and the abscissa represents the throttle opening of the ETV 82.

In FIG. 6, the dotted line a shows the relationship between the rotation speed of the engine 107 and the throttle opening when the transmission gears 5c, 5d (FIG. 2) are in the neutral positions. When the transmission gears 5c, 5d are in the neutral positions, the relationship between the rotation speed of the engine 107 and the throttle opening exhibits a hysteresis loop as shown in FIG. 6. Note that the relationship shown by the dotted line a can be derived from, for example, an experiment, a simulation using a computer or other suitable method.

In the present preferred embodiment, a strip-shaped region in between two parallel straight lines circumscribing the dotted line a (the region between the one-dot and dash line b and the one-dot and dash line c) is defined as a boundary region A while a region below the one-dot and dash line b is defined as a driving region B and a region above the one-dot and dash line c is defined as a driven region C.

In the determination of the state (the driving state, the boundary state and the driven state) of the engine 107, the CPU 502 calculates the rotation speed of the engine 107 based on the value detected by the crank angle sensor SE2. Then, the CPU 502 determines to which one of the above three regions the relationship between the engine 107 and the throttle opening belongs based on the calculated rotation speed and the detected value of the throttle sensor SE3. In this manner, the CPU 502 determines in which state the engine 107 is among the driving state, the boundary state and the driven state.

For example, the state where the rotation speed of the engine 107 is 6000 rpm and the throttle opening is 12 degrees belongs to the driving region B. In this case, the CPU 502 determines that the engine 107 is in the driving state.

Moreover, the state where the rotation speed of the engine 107 is 6000 rpm and the throttle opening is 2 degrees, for example, belongs to the driven region C. In this case, the CPU 502 determines that the engine 107 is in the driven state.

Furthermore, the state where the rotation speed of the engine 107 is 6000 rpm and the throttle opening is 6 degrees, for example, belongs to the boundary region A. In this case, the CPU 502 determines that the engine 107 is in the boundary state.

Note that the boundary state refers to the state of the engine 107 when the torque transmitted from the crank 2 (FIG. 2) to the main shaft 5a (FIG. 2) is equal to or less than a predetermined value, or when the torque transmitted from the main shaft 5a to the crank 2 is equal to or less than a predetermined value. That is, the torque is not substantially transmitted between the crank 2 and the main shaft 5a when the engine 107 is in the boundary state. In this case, the large pressure (engaging force) is not generated in the contact surface of the dog hole 52 (FIG. 4) and the dog 54 (FIG. 4). Therefore, the driver can easily move the sliding gear 53 in the direction away from the fixed gear 51 by operating the shift pedal 11 without disconnecting the clutch 3 (FIG. 2), even though the output of the engine 107 is not adjusted.

(c) Timing of the output adjustment of the engine

Next, the timing of the output adjustment of the engine 107 by the CPU 502 is described with reference to the drawings.

Figure 7A:
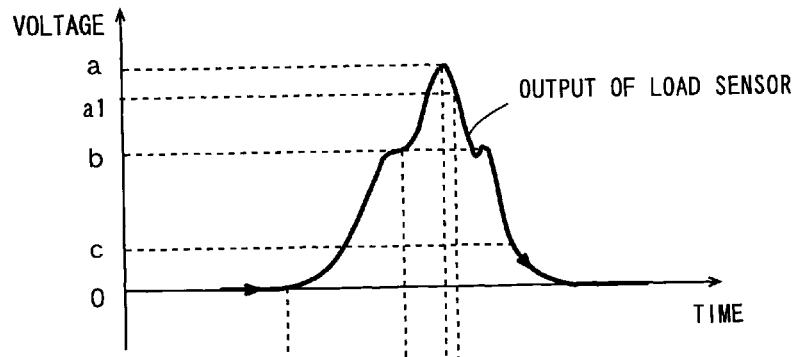
FIGS. 7A to 7C are diagrams explaining a timing of an output adjustment of the engine by a CPU when a driver performs an up-shifting operation when the engine is in a driving state.
Figure 7B:
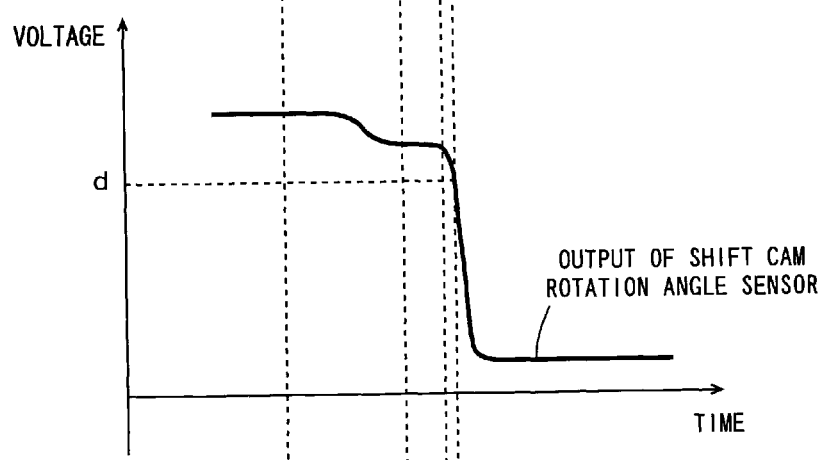
Figure 7C:
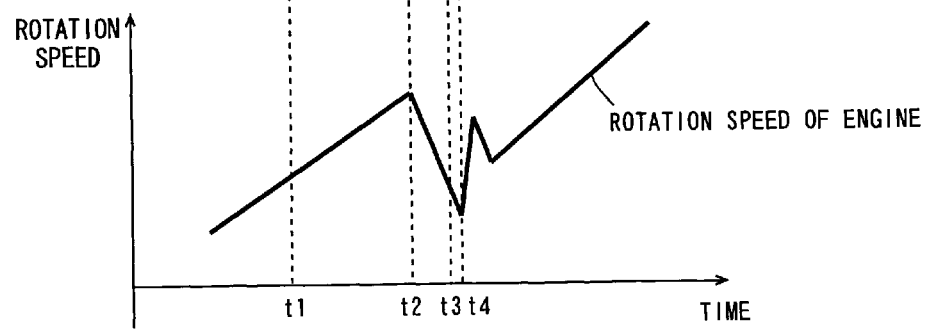

FIGS. 7A to 7C are diagrams for describing the timing of the output adjustment of the engine 107 by the CPU 502 when the driver performs the up-shifting operation when the engine 107 is in the driving state. In addition, FIGS. 8A to 8C are diagrams for use in describing the timing of the output adjustment of the engine 107 by the CPU 502 when the driver performs the down-shifting operation when the engine 107 is in the driven state.

Figure 8A:
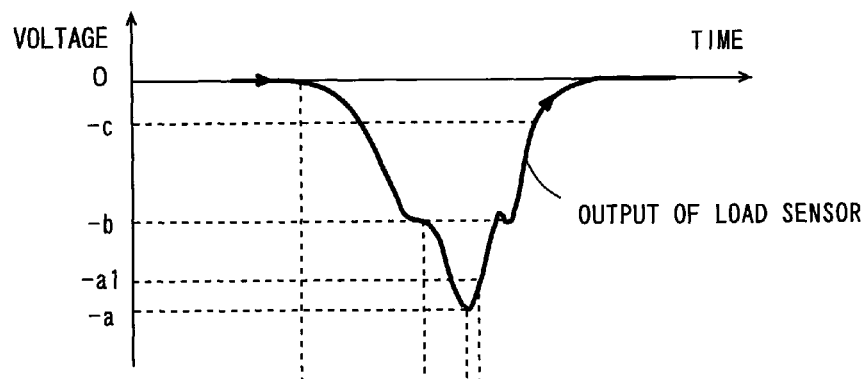
FIGS. 8A to 8C are diagrams explaining a timing of the output adjustment of the engine by the CPU when the driver performs a down-shifting operation when the engine is in a driven state.
Figure 8B:
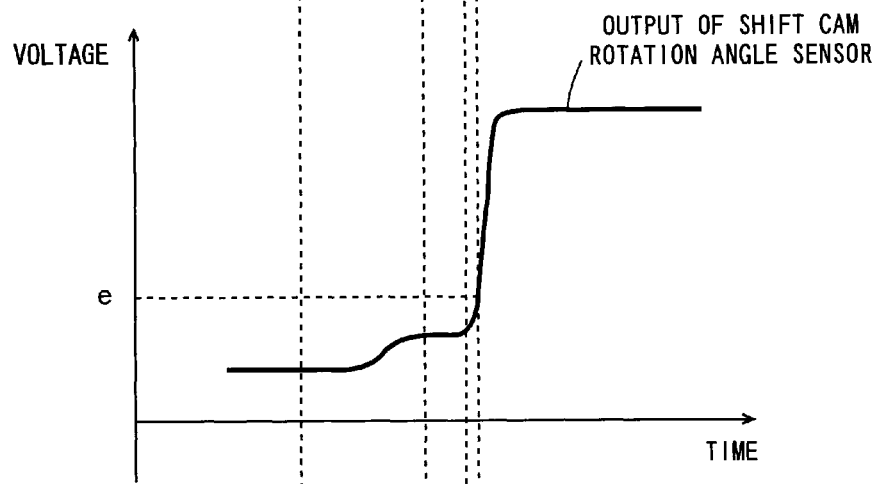
Figure 8C:
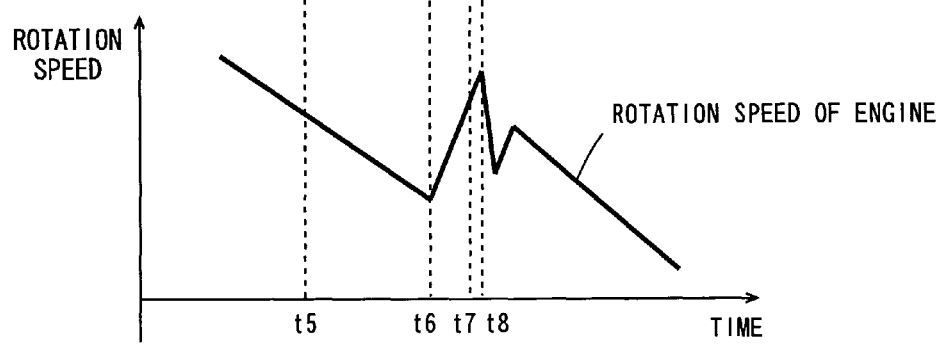

Note that FIG. 7A and FIG. 8A show output waveforms (detected values) of the load sensor SE6, while FIG. 7B and FIG. 8B show output waveforms (detected values) of the shift cam rotation angle sensor SE4. In FIGS. 7A and 7B and FIGS. 8A and 8B, the ordinates represent voltage and the abscissas represent time. In addition, FIG. 7C and FIG. 8C show the rotation speed of the engine 107. In FIG. 7C and FIG. 8C, the ordinates represent the rotation speed, and the abscissas represent time.

First, FIGS. 7A to 7C are described. As shown in FIG. 7C, the rotation speed of the engine 107 is increased as time passes when the engine 107 is in the driving state. In the example of FIGS. 7A to 7C, the driver starts the up-shifting operation at a point t1 within the period where the rotation speed of the engine 107 is being increased.

The detected value (voltage value) of the load sensor SE6 is increased in accordance with the increase of the operation amount of the shift pedal 11 (FIG. 2) by the driver, as shown in FIG. 7A. Then, the detected value of the load sensor SE6 becomes a maximum value a at a point t3 immediately before the engagement of the fixed gear 51 (FIG. 4) with the sliding gear 53 (FIG. 4) is released.

With the engagement of the fixed gear 51 with the sliding gear 53 released, the driver lifts his/her foot off the shift pedal 11. Thus, the detected value of the load sensor SE6 drops from the maximum value a to zero, as shown in FIG. 7A.

As shown in FIG. 7B, the detected value (voltage value) of the shift cam rotation angle sensor SE4 gradually drops in accordance with the increase of the operation amount of the shift pedal 11 by the driver, and rapidly drops due to the release of the engagement of the fixed gear 51 with the sliding gear 53.

Note that deflections or play exist in each structural element of the transmission operating mechanism 111 (FIG. 2) and the shift mechanism 7 (FIG. 2). Therefore, the detected values of the load sensor SE6 and the shift cam rotation angle sensor SE4 unstably vary between the points t1 and t3.

Here, in the present preferred embodiment, the output adjustment of the engine 107 is started at a point t2 where the detected value (voltage value) of the load sensor SE6 reaches a value b, and the output of the engine 107 is subsequently reduced. Thus, the rotation speed of the engine 107 is decreased as shown in FIG. 7C, so that the pressure (engaging force) in the contact surface of the dog hole 52 (FIGS. 4A to 4C) of the fixed gear 51 (FIGS. 4A to 4C) and the dog 54 (FIGS. 4A to 4C) of the sliding gear 53 (FIGS. 4A to 4C) is reduced. As a result, the state of the fixed gear 51 and the sliding gear 53 is changed from the engaged state shown in FIG. 4A to the released state described in FIG. 4C. This enables the sliding gear 53 to easily move in the direction away from the fixed gear 51, so that the driver can operate the gearshift without disconnecting the clutch 3 (FIG. 2).

Note that there will be substantially no play in each structural element of the transmission operating mechanism 111 and the shift mechanism 7 when the detected value of the load sensor SE6 reaches the value b in the example of FIG. 7A. That is, the release operation of the dog hole 52 and the dog 54 is started when the detected value of the load sensor SE6 reaches the value b. Accordingly, the output adjustment of the engine 107 is started when the release operation of the dog hole 52 and the dog 54 is started in the present preferred embodiment.

Moreover, the output adjustment of the engine 107 is finished at a point t4 where the engagement of the fixed gear 51 with the sliding gear 53 is released and the detected value of the shift cam rotation angle sensor SE4 (FIG. 7B) becomes a value d, and the output of the engine 107 is subsequently increased again. This causes the rotation speed of the engine 107 to increase again, as shown in FIG. 7C. As a result, the fixed gear 51 and the sliding gear 53 are engaged with each other (the engaged state of FIG. 4A), so that the gearshift is completed.

Note that since the engagement of the fixed gear 51 with the sliding gear 53 is released at the point t4, the detected value of the load sensor SE6 becomes a value a1 that is slightly lower than the maximum value a, as shown in FIG. 7A.

Next, FIGS. 8A to 8C are described. As shown in FIG. 8C, the rotation speed of the engine 107 is decreased as time passes when the engine 107 is in the driven state. In the example of FIGS. 8A to 8C, the driver starts the down-shifting operation at a point t5 within the period where the rotation speed of the engine 107 is being decreased.

As shown in FIG. 8A, the detected value of the load sensor SE6 is decreased in accordance with the increase of the operation amount of the shift pedal 11 (FIG. 2) by the driver. Then, the detected value of the load sensor SE6 becomes a minimum value −a at a point t7 immediately before the engagement of the fixed gear 51 (FIGS. 4A to 4C) with the sliding gear 53 (FIGS. 4A to 4C) is released.

With the engagement of the fixed gear 51 with the sliding gear 53 released, the driver lifts his/her foot off the shift pedal 11. Accordingly, the detected value of the load sensor SE6 is increased from the minimum value −a to zero, as shown in FIG. 8A.

The detected value (voltage value) of the shift cam rotation angle sensor SE4 is gradually increased in accordance with the increase of the operation amount of the shift pedal 11 by the driver, and is rapidly increased due to the release of the engagement of the fixed gear 51 with the sliding gear 53, as shown in FIG. 8B.

Here, in the present preferred embodiment, the output adjustment of the engine 107 is started at a point t6 where the detected value (voltage value) of the load sensor SE6 reaches a value −b, and the output of the engine 107 is subsequently increased. Thus, as shown in FIG. 8C, the rotation speed of the engine 107 is increased, and the pressure (engaging force) in the contact surface of the dog hole 52 (FIGS. 4A to 4C) of the fixed gear 51 (FIGS. 4A to 4C) and the dog 54 (FIGS. 4A to 4C) of the sliding gear 53 (FIGS. 4A to 4C) is reduced. As a result, the state of the fixed gear 51 and the sliding gear 53 is changed from the engaged state shown in FIG. 4B to the released state described in FIG. 4C. This enables the sliding gear 53 to easily move in the direction away from the fixed gear 51, whereby the driver can operate the gearshift without disconnecting the clutch 3 (FIG. 2).

Note that there will be substantially no play in each structural element of the transmission operating mechanism 111 and the shift mechanism 7 when the detected value of the load sensor SE6 reaches the value −b, in the example of FIG. 8A. That is, the release operation of the dog hole 52 and the dog 54 is started when the detected value of the load sensor SE6 reaches the value −b. Thus, the output adjustment of the engine 107 is started when the release operation of the dog hole 52 and the dog 54 is started in the present preferred embodiment.

Furthermore, the output adjustment of the engine 107 is finished at a point t8 where the engagement of the fixed gear 51 with the sliding gear 53 is released and the detected value of the shift cam rotation sensor SE4 (FIG. 8B) reaches a value e, and the output of the engine 107 is subsequently decreased again. This causes the rotation speed of the engine 107 to decrease again, as shown in FIG. 8C. As a result, the fixed gear 51 and the sliding gear 53 are again engaged with each other (the engaged state of FIG. 4B), so that the gearshift is completed.

Note that since the engagement of the fixed gear 51 with the sliding gear 53 is released at the point t8, the detected value of the load sensor SE6 becomes a value −a1 that is slightly higher than the minimum value −a, as shown in FIG. 8A.

As described above, the output adjustment of the engine 107 is started when an absolute value of the detected value (voltage value) of the load sensor SE6 becomes at least the value b in the present preferred embodiment. In addition, the output adjustment of the engine 107 is finished when the detected value of the shift cam rotation angle sensor SE4 becomes equal to or less than the value d in the up-shifting operation. In the down-shifting operation, the output adjustment of the engine 107 is finished when the detected value of the shift cam rotation angle sensor SE4 becomes at least the value e. Furthermore, the CPU 502 determines that the gearshift is completed when the absolute value of the detected value of the load sensor SE6 becomes equal to or less than the value c that is smaller than the value b.

(d) Control Flow

Next, details of the control operation of the CPU 502 are described.

Note that the absolute value of the detected value of the load sensor SE6 when the output adjustment of the engine 107 is started is referred to as a first threshold value in the following description. In addition, the detected value of the shift cam rotation angle sensor SE4 when the output adjustment of the engine 107 is finished in the up-shifting operation is referred to as a second threshold value. Moreover, the detected value of the shift cam rotation angle sensor SE4 when the output adjustment of the engine 107 is finished in the down-shifting operation is referred to as a third threshold value. Furthermore, the absolute value of the detected value of the load sensor SE6 in which the gearshift is determined to be completed is referred to as a fourth threshold value. In the examples of FIGS. 7A to 7C and FIGS. 8A to 8C, the values b, d, e, and c correspond to the first, second, third, and fourth threshold values, respectively.

Figure 9:
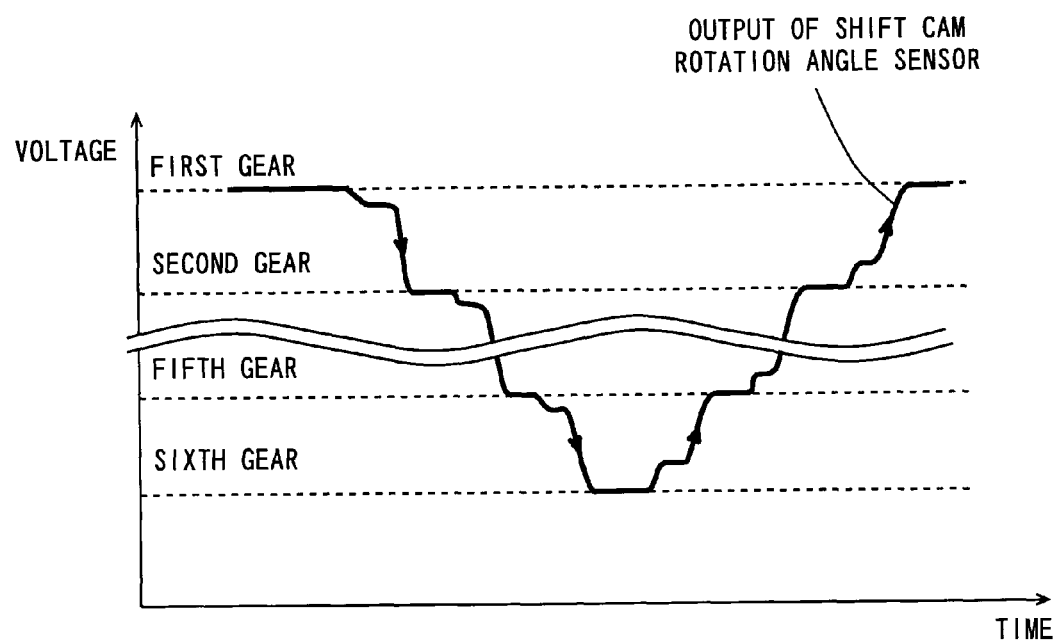
FIG. 9 is a diagram showing an example of a value detected by a shift cam rotation angle sensor when gear positions are changed between the first gear and the sixth gear.

Note that the detected value of the shift cam rotation angle sensor SE4 varies depending on the gear positions. FIG. 9 is a diagram showing an example of the detected value (voltage value) of the shift cam rotation angle sensor SE4 when the gear positions are changed between the first gear and the sixth gear. Note that the ordinate represents voltage and the abscissa represents time in FIG. 9.

As shown in FIG. 9, the detected value of the shift cam rotation angle sensor SE4 is high when the gears are in low speed positions, and becomes smaller as the gears move to higher speed positions. Thus, the second and third threshold values vary depending on the gear positions.

Note that the first to fourth threshold values and the fifth and sixth threshold values, described later, are stored in the RAM 504 of the ECU 50 (FIG. 5).

Figure 10:
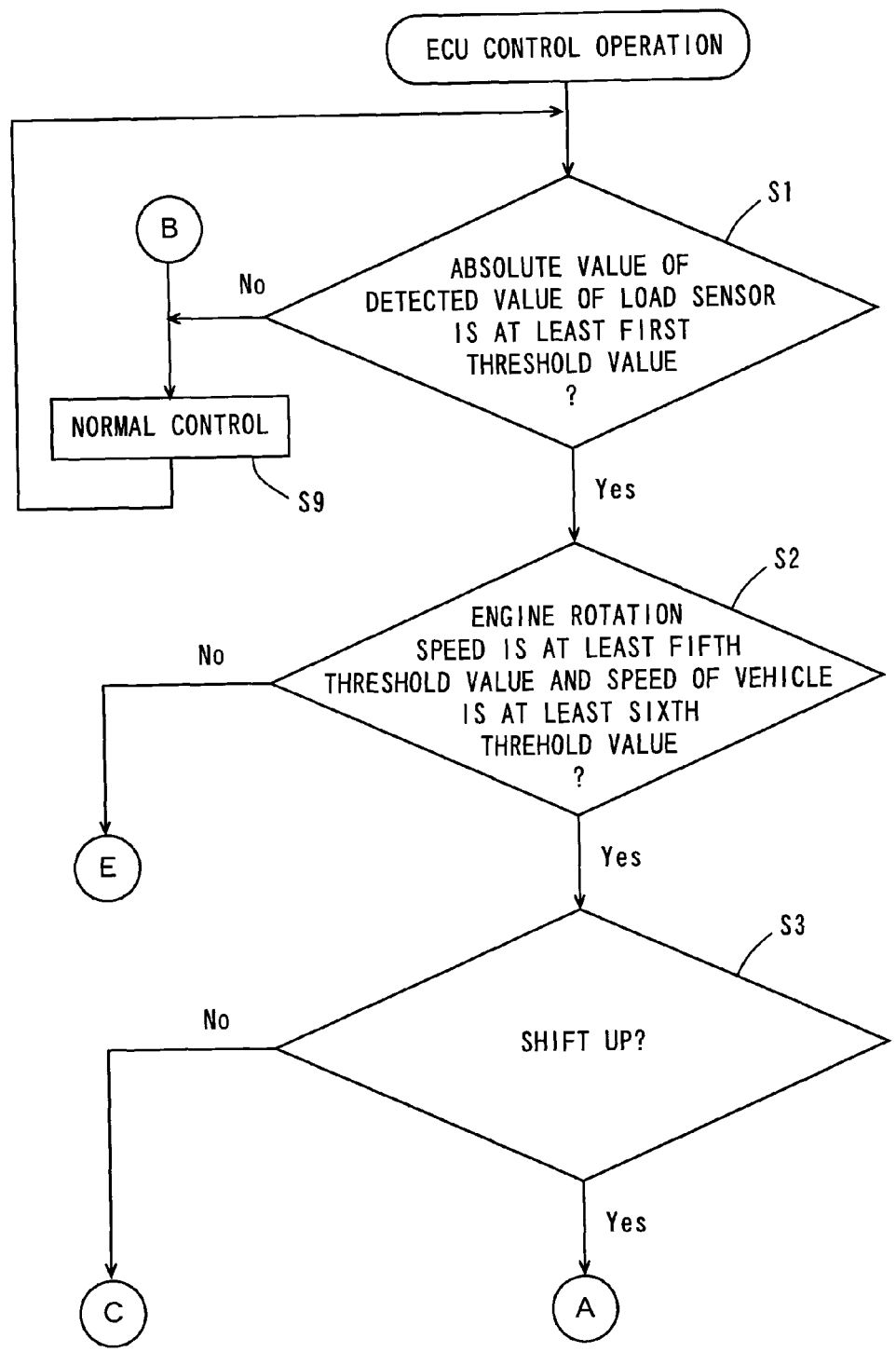
FIG. 10 is a flowchart showing an example of a control operation of the CPU.
Figure 11:
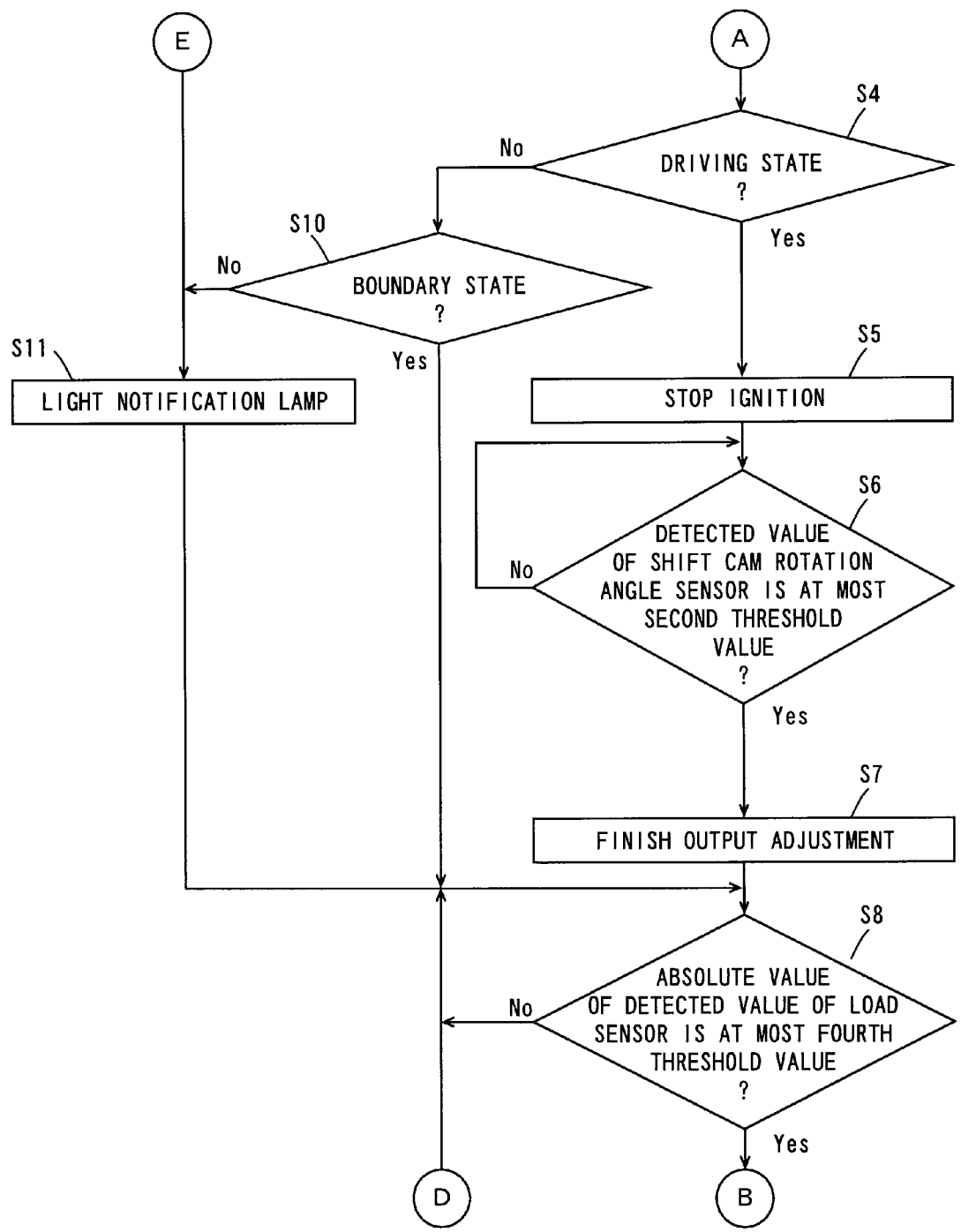
FIG. 11 is a flowchart showing an example of the control operation of the CPU.
Figure 12:
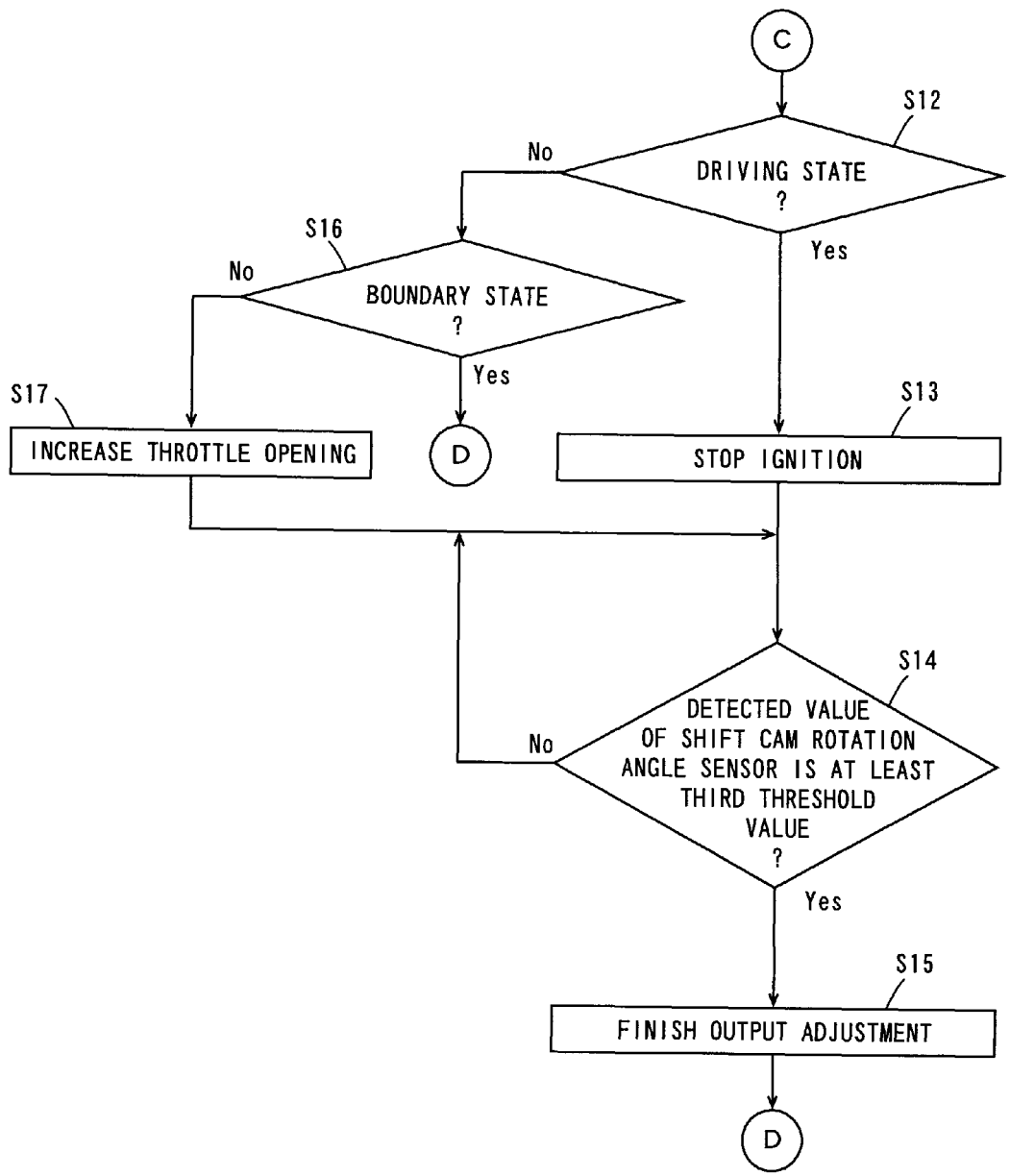
FIG. 12 is a flowchart showing an example of the control operation of the CPU.

FIGS. 10-12 are flowcharts that show an example of the control operation of the CPU 502.

As shown in FIG. 10, the CPU 502 determines whether or not the absolute value of the detected value of the load sensor SE6 is at least the first threshold value (corresponding to the value b of FIG. 7A and FIG. 8A) (step S1). Note that in the step S1, the CPU 502 may determine whether or not the absolute value of the detected value of the load sensor SE6 exceeds the first threshold value for a predetermined period or longer, since the detected value of the load sensor SE6 includes noises in some cases.

When the absolute value of the detected value of the load sensor SE6 is at least the first threshold value, the CPU 502 determines whether or not the rotation speed of the engine 107 is at least the fifth threshold value (1500 rpm, for example) and the speed of a vehicle body is at least the sixth threshold value (15 km/h, for example) (step S2). Note that the speed of the vehicle body of the motorcycle 100 is calculated by the CPU 502 based on the detected value of the drive shaft rotation speed sensor SE5. Effects of providing the process of the step S2 will be described later.

When the rotation speed of the engine 107 is at least the fifth threshold value and the speed of the vehicle body is at least the sixth threshold value, the CPU 502 determines whether or not the up-shifting operation is performed by the driver (step S3). Note that the CPU 502 determines that the up-shifting operation is performed when the detected value of the load sensor SE6 is a positive value, and determines that the down-shifting operation is performed when the detected value of the load sensor SE6 is a negative value.

When the up-shifting operation is performed by the driver, the CPU 502 determines whether or not the engine 107 is in the driving state (step S4) as shown in FIG. 11. The CPU 502 decreases the output of the engine 107 by stopping the ignition of the fuel-air mixture by an ignition plug 78 when the engine 107 is in the driving state (step S5). As described above, the output of the engine 107 is decreased in a process of the step S5, so that the sliding gear 53 can be easily moved in the direction away from the fixed gear 51.

Next, the CPU 502 determines whether or not the detected value of the shift cam rotation angle sensor SE4 is equal to or less than the second threshold value (corresponding to the value d of FIG. 7B) (step S6). Note that the CPU 502 may determine whether or not the detected value of the shift cam rotation angle sensor SE4 is less than the second threshold value for a predetermined period or longer in the step S6, since the detected value of the shift cam rotation angle sensor SE4 includes noises in some cases.

The CPU 502 determines that the engagement of the fixed gear 51 (FIGS. 4A to 4C) with the sliding gear 53 (FIGS. 4A to 4C) is released, and then finishes the output adjustment of the engine 107 started in the step S5 when the detected value of the shift cam rotation angle sensor SE4 is equal to or less than the second threshold value (step S7).

Next, the CPU 502 determines whether or not the absolute value of the detected value of the load sensor SE6 is equal to or less than the fourth threshold value (step S8). Note that the CPU 502 may determine whether or not the absolute value of the detected value of the load sensor SE6 is smaller than the fourth threshold value for a predetermined period or longer in the step S8, since the detected value of the load sensor SE6 includes noises in some cases.

When the absolute value of the detected value of the load sensor SE6 is equal to or less than the fourth threshold value, the CPU 502 determines that the gearshift is completed, and performs a normal control as shown in FIG. 10 (step S9). In the normal control of the step S9, the CPU 502 adjusts the throttle opening of the ETV 82 based on the detected value of the accelerator opening sensor SE1. Thus, the output of the engine 107 is adjusted depending on the operation amount of the accelerator grip 106 by the driver in the normal control.

When the engine 107 is not in the driving state in the step S4 of FIG. 11, the CPU 502 determines whether or not the engine 107 is in the boundary state (step S10).

When the engine 107 is in the boundary state, the CPU 502 proceeds to the step S8 without adjusting the output of the engine 107. Note that the engaging force of the sliding gear 53 (FIGS. 4A to 4C) with the fixed gear 51 (FIGS. 4A to 4C) is not very large in the boundary state as described above. This enables the driver to easily move the sliding gear 53 in the direction away from the fixed gear 51 without the output adjustment of the engine 107.

When the engine 107 is not in the boundary state, that is, when the engine 107 is in the driven state in the step S10, the CPU 502 lights the notification lamp 60 (FIG. 1) without adjusting the output of the engine 107 (step S11).

Note that the fixed gear 51 (FIGS. 4A to 4C) and the sliding gear 53 (FIGS. 4A to 4C) are maintained in the engaged state shown in FIG. 4A, since the output of the engine 107 is not adjusted in this case. Thus, it is difficult to release the engagement of the fixed gear 51 with the sliding gear 53. In this manner, it becomes difficult to operate the gearshift because of the control by the CPU 502 when the engine 107 is in the driven state in the step S10. This prevents the transmission 5 from being shifted up during deceleration. As a result, a rapid increase in the speed of the motorcycle 100 is prevented during deceleration, so that the drivability of the motorcycle 100 is improved.

Moreover, lighting of the notification lamp 60 enables the driver to easily recognize that it is difficult to operate the gearshift because of the control by the CPU. This enables the driver to quickly stop the shift operation. As a result, the drivability of the motorcycle 100 is further improved.

The CPU 502 proceeds to the step S8 after lighting the notification lamp 60 in the step S11.

When the detected value of the shift cam rotation angle sensor SE4 is greater than the second threshold value in the step S6, the CPU 502 waits until the detected value of the shift cam rotation angle sensor SE4 becomes equal to or less than the second threshold value. That is, the CPU 502 continues the output adjustment of the engine 107 until the engagement of the fixed gear 51 with the sliding gear 53 is released.

When the absolute value of the detected value of the load sensor SE6 is greater than the fourth threshold value in the step S8, the CPU 502 waits until the absolute value of the detected value of the load sensor SE6 becomes equal to or less than the fourth threshold value.

When the up-shifting operation is not performed by the driver in the step S3 of FIG. 10, that is, when the down-shifting operation is performed by the driver, the CPU 502 determines whether or not the engine 107 is in the driving state as shown in FIG. 12 (step S12). When the engine 107 is in the driving state, the CPU 502 decreases the output of the engine 107 by stopping the ignition of the fuel-air mixture by the ignition plug 78 (step S13). The output of the engine 107 is decreased in the process of this step S13, so that the sliding gear 53 can be easily moved in the direction away from the fixed gear 51 as described above.

Next, the CPU 502 determines whether or not the detected value of the shift cam rotation angle sensor SE4 is at least the third threshold value (corresponding to the value e of FIG. 8B) (step S14). Note that the CPU 502 may determine whether or not the detected value of the shift cam rotation angle sensor SE4 exceeds the third threshold value for a predetermined period or longer in the step S14, since the detected value of the shift cam rotation angle sensor E4 includes noises in some cases.

When the detected value of the shift cam rotation angle sensor SE4 is at least the third threshold value, the CPU 502 determines that the engagement of the fixed gear 51 (FIGS. 4A to 4C) with the sliding gear 53 (FIGS. 4A to 4C) is released, and then finishes the output adjustment of the engine 107 started in the step S13 or a step S17, described later (step S15). Then, the CPU 502 proceeds to the step S8 of FIG. 11.

When the engine 107 is not in the driving state in the step S12 of FIG. 12, the CPU 502 determines whether or not the engine 107 is in the boundary state (step S16).

When the engine 107 is in the boundary state, the CPU 502 proceeds to the step S8 of FIG. 11 without adjusting the output of the engine 107. Note that the driver can easily move the sliding gear 53 (FIGS. 4A to 4C) in the direction away from the fixed gear 51 (FIGS. 4A to 4C) without the output adjustment of the engine 107 in the boundary state, as described above.

When the engine 107 is not in the boundary state in the step S16 of FIG. 12, that is, when the engine 107 is in the driven state, the CPU 502 increases the throttle opening of the ETV 82 and increases the output of the engine 107 (the step S17). The output of the engine 107 is increased in the process of this step S17, so that the sliding gear 53 can be easily moved in the direction away from the fixed gear 51 as described above. Then, the CPU 502 proceeds to the step S14.

When the detected value of the shift cam rotation angle sensor SE4 is less than the third threshold value in the step S14, the CPU 502 waits until the detected value of the shift cam rotation angle sensor SE4 becomes at least the third threshold value. That is, the CPU 502 continues the output adjustment of the engine 107 until the engagement of the fixed gear 51 with the sliding gear 53 is released.

When the absolute value of the detected value of the load sensor SE6 is less than the first threshold value in the step S1 of FIG. 10, the CPU determines that the shift operation is not started by the driver, and then proceeds to the step S9 to perform the normal control.

In addition, when the rotation speed of the engine 107 is less than the fifth threshold value or the speed of the vehicle body is less than the sixth threshold value in the step S2, the CPU 502 proceeds to the step S11 of FIG. 11 and lights the notification lamp 60 (FIG. 1) without controlling the output of the engine 107.

Note that since the output of the engine 107 is not adjusted in this case, a rapid change in the output of the engine 107 is prevented during low speed driving. This prevents the rear wheel 115 (FIG. 1) from slipping and improves the drivability of the motorcycle 100.

Furthermore, in this case, the fixed gear 51 (FIGS. 4A to 4C) and the sliding gear 53 (FIGS. 4A to 4C) are maintained in the engaged state shown in FIG. 4A. Thus, the gearshift is prevented since it is difficult to release the engagement of the fixed gear 51 with the sliding gear 53. Accordingly, a rapid change in the speed of the motorcycle 100 is prevented during low speed driving, and the drivability of the motorcycle 100 is improved.

Moreover, lighting of the notification lamp 60 enables the driver to easily recognize that it is difficult to operate the gearshift because of the control by the CPU 502. This enables the driver to stop the shift operation quickly. As a result, the drivability of the motorcycle 100 is further improved.

(5) Effects (a) As described above, the output of the engine 107 is decreased by the CPU 502 when the engine 107 is in the driving state when the driver performs the up-shifting operation or the down-shifting operation in the present preferred embodiment. In addition, the output of the engine 107 is increased by the CPU 502 when the engine 107 is in the driven state when the driver performs the down-shifting operation. Accordingly, the pressure (engaging force) generated in the contact surface of the fixed gear 51 and the sliding gear 53 is reduced, so that the driver can perform the clutchless shifting smoothly.

(b) The CPU 502 performs the normal control when the engine 107 is in the boundary state when the driver performs the up-shifting operation or the down-shifting operation. That is, the output of the engine 107 is not adjusted when the torque having at least a predetermined value is not transmitted between the engine 107 (the crank 2) and the transmission 5 (the main shaft 5a).

Here, as described above, the large pressure (engaging force) is not generated in the contact surface of the fixed gear 51 and the sliding gear 53 when the torque transmitted between the engine 107 and the transmission 5 is small. Thus, the driver can perform the clutchless shifting easily even though the output of the engine 107 is not adjusted. In this case, shocks generated by the adjustment of the output of the engine 107 can be prevented, so that the drivability of the motorcycle 100 is improved. This enables the driver to enjoy comfortably driving the motorcycle 100.

(c) Providing the boundary state can prevent the output control of the engine 107 that should be performed in the driven state from being performed in the driving state, and prevent the output control of the engine 107 that should be performed in the driving state from being performed in the driven state. This can avoid the output of the engine 107 from being adjusted improperly even if the determination as to whether the engine 107 is in the driving state or the driven sate cannot be properly made because the engine 107 is in the vicinity of the boundary between the driving state and the driven state. This enables the clutchless shifting to be smoothly performed, and improves the drivability of the motorcycle 100.

(d) In the present preferred embodiment, the control by the CPU 502 makes it difficult to operate the gearshift when the engine 107 is in the driven state when the up-shifting operation is performed by the driver. This can prevent the transmission 5 from being shifted up during the deceleration of the motorcycle 100. As a result, the rapid increase in the speed of the motorcycle 100 is prevented during the deceleration, and the drivability of the motorcycle 100 is improved.

(e) When the motorcycle 100 is driven at a low speed, the control by the CPU 502 makes it difficult to operate the gearshift. Accordingly, the rapid change in the speed of the motorcycle 100 is prevented during low speed driving. This prevents the rear wheel 115 from slipping, and improves the drivability of the motorcycle 100.

(f) When it is difficult to operate the gearshift, the notification lamp is lit by the CPU 502. In this case, the driver can easily recognize that the CPU 502 makes it difficult to operate the gearshift. Thus, the driver can quickly stop the shift operation. As a result, the drivability of the motorcycle 100 is further improved. In addition, the driver can easily determine whether or not a failure is occurring in the motorcycle 100 by confirming the state of the notification lamp 60, even if the clutchless shifting cannot be performed.

(g) Note that an appropriate period of time for the output adjustment sometimes cannot be ensured when the adjustment of the output of the engine 107 is finished based on the rotation speed of the engine 107, the elapsed time after the shift operation or the like. Thus, the clutchless shifting cannot be performed smoothly in some cases.

In contrast, the adjustment of the output of the engine 107 is determined to be finished based on the detected value of the shift cam rotation angle sensor SE4 in the present preferred embodiment. Accordingly, the adjustment of the output of the engine 107 can be finished at the most appropriate timing regardless of the operation amount and the operation speed of the shift pedal 11 by the driver. This enables the clutchless shifting to be performed more quickly, and easily makes the output of the engine 107 stable.

(h) In addition, the ignition of the fuel-air mixture by the ignition plug 78 is stopped, so that the output of the engine 107 is decreased in the present preferred embodiment. In this case, the output of the engine 107 can be rapidly decreased. This enables the clutchless shifting to be performed quickly.

(i) Furthermore, the state (the driving state, the boundary state and the driven state) of the engine 107 is determined based on the driving state determination data stored in the RAM 504 (ROM 503) in the present preferred embodiment. In this case, a sensor for detecting the transmission state of the torque is not required, so that a production cost of the motorcycle 100 can be reduced.

While the output of the engine 107 is decreased by stopping the ignition of the fuel-air mixture by the ignition plug 78 in the step S5 of FIG. 11 and the step S13 of FIG. 12 in the above described preferred embodiment, the output of the engine 107 may be decreased by retarding the ignition timing. In addition, the output of the engine 107 may be decreased by controlling the ETV 82.

Moreover, while the adjustment of the output of the engine 107 is finished immediately after the engagement of the fixed gear 51 with the sliding gear 53 is released (at the point t4 in FIG. 7 and the point t8 in FIG. 8) in the above described preferred embodiment, the adjustment of the output of the engine 107 may be finished at other timings. For example, the adjustment of the output of the engine 107 may be finished in the vicinity of a point of time where the sliding gear 53 moves to engage with another fixed gear 51. In this case, the second threshold value (the value d of FIG. 7B) is decreased, and the third threshold value (the value e of FIG. 8B is increased.

Furthermore, while the state (the driving state, the boundary state and the driven sate) of the engine 107 is determined based on the driving state determination data in the above described preferred embodiment, the state (the driving state, the boundary state and the driven sate) of the engine 107 may be determined by other methods.

For example, a three-dimensional map that shows the relationships among the rotation speed of the engine 107, the throttle opening of the ETV 82 and the torque (driving force) generated by the engine 107 may be stored in the RAM 504 (ROM 503) in the ECU 50. In this case, the torque generated by the engine 107 can be derived from the three-dimensional map based on the rotation speed of the engine 107 and the throttle opening of the ETV 82. Then, it may be determined that the engine 107 is in the driving state when the derived torque is a positive value of at least a predetermined value, that it is in the boundary state when the absolute value of the derived torque is less than the predetermined value, and that it is in the driven state when the absolute value of the derived torque is a negative value of at least the predetermined value.

In addition, while the notification lamp 60 is used as a notification device for the driver in the above described preferred embodiment, other notification devices may be used. For example, a device that generates sound, vibration or the like may be used instead of the notification lamp 60.

While the motorcycle 100 has been described as an example of a vehicle in the above described preferred embodiments, the vehicle may be another vehicle, such as a three-wheeled motor vehicle, a four-wheeled motor vehicle or other suitable vehicle.

In the following paragraph, non-limiting examples of correspondences between various elements recited in the claims below and those described above with respect to various preferred embodiments of the present invention are explained.

In the above described preferred embodiment, the load sensor SE6 is an example of a detector, the CPU 502 is an example of an engine output adjuster, the fifth threshold value is an example of a second value, the sixth threshold value is an example of a third value, the rear wheel 115 is an example of a driving wheel, and the notification lamp 60 is an example of a notifier.

As the elements recited in the claims, various other elements having the structure or function as recited in the claims may be employed.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A control system that adjusts an output of an engine in a vehicle including a transmission that transmits a torque generated by the engine depending on an accelerator operation amount to a drive wheel, the control system comprising:
   a detector that detects a shift operation of the transmission by a driver; and
   an engine output adjuster that, when the shift operation of the transmission is detected by the detector, decreases the output of the engine when the torque is at least a first value in a driving state where the torque is transmitted from the engine to the transmission and does not decrease the output when the torque is less than the first value in the driving state.

2. The control system according to claim 1, wherein the engine output adjuster does not decrease the output regardless of the value of the torque in the driving state when a rotation speed of the engine is less than a second value when the shift operation of the transmission is detected by the detector.

3. The control system according to claim 2, wherein when a down-shifting operation of the transmission is detected by the detector, the engine output adjuster increases the output of the engine when the torque is at least a fourth value in a driven state where the torque is transmitted from the transmission to the engine and the engine output adjuster does not increase the output when the torque is less than the fourth value in the driven state.

4. The control system according to claim 3, wherein the engine output adjuster does not increase the output regardless of the value of the torque in the driven state or the value of the torque in the driving state when the rotation speed of the engine is less than the second value when the down-shifting operation of the transmission is detected by the detector.

5. The control system according to claim 3, further comprising a notifier that provides notification in order to urge the driver to stop the shift operation when the torque in the driven state is at least the fourth value when an up-shifting operation of the transmission is detected by the detector.

6. The control system according to claim 3, further comprising a throttle valve for adjusting an amount of air taken into the engine, wherein the engine output adjuster determines whether or not the torque is at least the fourth value based on the rotation speed of the engine and an opening of the throttle valve.

7. The control system according to claim 6, wherein the fourth value is preset based on the rotation speed of the engine and the opening of the throttle valve.

8. The control system according to claim 1, wherein the engine output adjuster does not decrease the output regardless of the value of the torque in the driving state when a speed of the vehicle is less than a third value when the shift operation of the transmission is detected by the detector.

9. The control system according to claim 8, wherein when a down-shifting operation of the transmission is detected by the detector, the engine output adjuster increases the output of the engine when the torque is at least a fourth value in a driven state where the torque is transmitted from the transmission to the engine and the engine output adjuster does not increase the output when the torque is less than the fourth value in the driven state.

10. The control system according to claim 9, wherein the engine output adjuster does not increase the output regardless of the value of the torque in the driven state or the value of the torque in the driving state when the speed of the vehicle is lower than the third value when the down-shifting operation of the transmission is detected by the detector.

11. The control system according to claim 9, further comprising a notifier that provides notification in order to urge the driver to stop the shift operation when the torque in the driven state is at least the fourth value when an up-shifting operation of the transmission is detected by the detector.

12. The control system according to claim 1, further comprising a throttle valve for adjusting an amount of air taken into the engine, wherein the engine output adjuster determines whether or not the torque is at least the first value based on the rotation speed of the engine and an opening of the throttle valve.

13. The control system according to claim 12, wherein the first value is preset based on the rotation speed of the engine and the opening of the throttle valve.

14. A vehicle comprising:
   a drive wheel;
   an engine that generates a torque for turning the drive wheel depending on an accelerator operation amount;
   a transmission that transmits the torque generated by the engine to the drive wheel; and
   a control system that adjusts an output of the engine, wherein the control system includes:
      a detector that detects a shift operation of the transmission by a driver; and
      an engine output adjuster that, when the shift operation of the transmission is detected by the detector, decreases the output of the engine when the torque is at least a first value in a driving state where the torque is transmitted from the engine to the transmission and does not decrease the output when the torque is less than the first value in the driving state.

* * * * *